April 4, 1961     H. GLASER     2,977,859
CHUCK FOR MACHINE TOOL
Filed Oct. 28, 1957
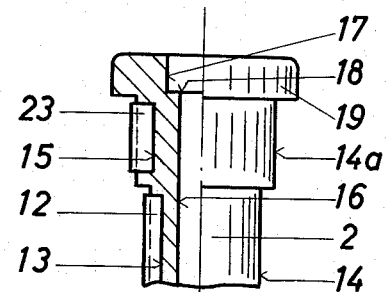
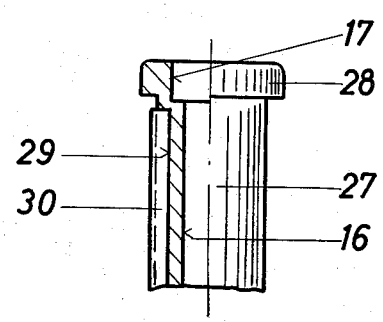
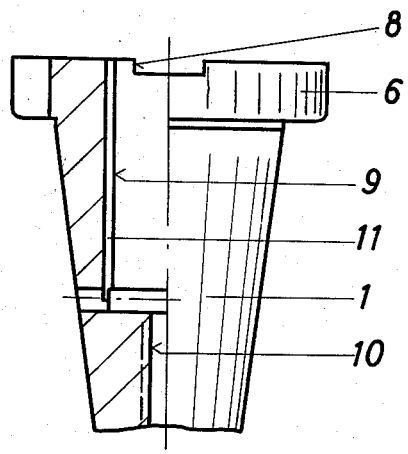
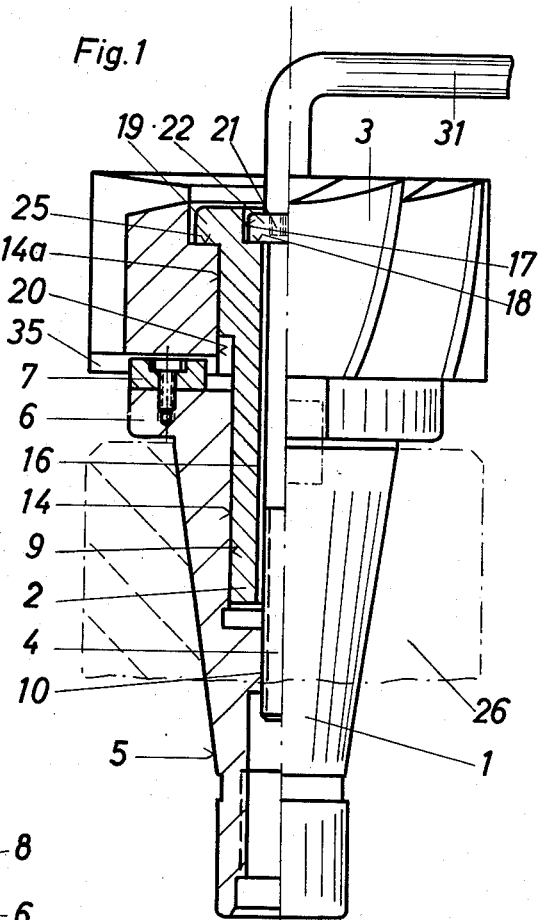
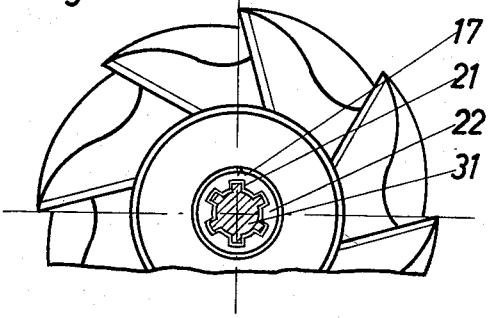
HERMANN GLASER
INVENTOR

United States Patent Office 2,977,859
Patented Apr. 4, 1961

2,977,859
CHUCK FOR MACHINE TOOL

Hermann Glaser, Basel, Switzerland (% Patentanwalt, Adolf O. Berglein, Bayerstr. 35–37, Munich 15, Germany)

Filed Oct. 28, 1957, Ser. No. 692,971

Claims priority, application Germany Nov. 2, 1956

3 Claims. (Cl. 90—11)

The present invention relates to a cutter chuck device, for use on the milling spindle head of a machine tool having a milling cutter receiving arbor and head bolt mounting of the milling cutter. In the mounting of milling cutters, as they are used presently, the milling cutters, e.g. shell end mill or face milling cutters, are held by disc screws (with grooves, slots or holes), which can be tightened by means of a screw driver or a special wrench.

Practice has shown, however, that the disc screws cannot perform the task of holding the milling tool rigidly in central position to complete satisfaction, because the radial and axial stresses must be absorbed almost completely by the extremely short disc screw. The disc screw head is too elastic due to the big difference between its diameter and that of its supporting bolt. Thus the short disc screw is continually under great bending stress, which, especially in case of great chip removals, quickly leads to the loosening of the screw and of the milling cutter and thus to inaccurate milling work, to diminish cutting performance and finally to the breaking of the milling cutter or the rupture of the clamping screw. A further disadvantage of the disc screws engaging directly the end face of the milling cutter consists of the fact that, depending upon the rotational direction of the milling cutter the disc screws and also the appertaining cutter arbors, left-hand thread or right-hand thread must be selectively utilized, as the clamping screws would loosen themselves too easily in case of a torsion stress in the rotational releasing direction.

It is an object of the invention to eliminate the above cited drawbacks and to make the fixing and the releasing of the milling cutter as simple as possible so that the interchanging of the milling cutters can be easily performed by one person.

The desired result is obtained in a cutter chuck device by providing a supplementary shell-shaped milling cutter centering and holding arbor with a middle axial through bore, inserting a head bolt from the free end face of the milling cutter and detachably attaching the head bolt to the milling cutter receiving arbor which is, in turn, rigidly fixed to the milling spindle head. The supplementary milling arbor is provided with a holding flange on the end face, with an adjacent centering shaft for the milling cutter and with a middle axial through bore for said head bolt. In this design the milling cutter receiving arbor, generally guided and held in the milling spindle head by means of a machine taper, need not be removed from the milling spindle head when a milling cutter is to be interchanged. Thus its precision taper surface and the taper of the milling spindle head are not exposed to any danger of damage or disfiguration which might modify the mounted position. Other objects and advantages will be apparent from a consideration of the specification and claims in connection with the accompanying drawings.

In the drawings some embodiments of the object of the invention are represented.

Fig. 1 is a longitudinal middle section through a milling cutter chuck device with receiving arbor and milling cutter fastened to it, Fig. 2 is a longitudinal middle section through a somewhat modified milling cutter receiving arbor, partially in lateral view, Figs. 3 and 5 are longitudinal middle sections through somewhat modified milling arbors with groove and key connection, partially in lateral view.

Fig. 4 is an end view of the cutter chuck device according to Fig. 1,

The milling chuck device shown as an example in Fig. 1 consists essentially of a milling cutter receiving arbor 1, a supplementary milling cutter arbor 2 and a head bolt 4 passed through the milling arbor 2, which head bolt together with the supplementary milling cutter arbor 2 holds a shell end milling cutter 3 on the milling cutter receiving arbor 1. The milling cutter receiving arbor 1 has a conical shaft 5 and an outwardly extending end flange 6 which supports the milling cutter 3 at its end face and which is in driving connection with the milling cutter 3 through radial driving keys or blocks 7 inserted in a transverse groove 8 (Fig. 2) of the milling cutter receiving arbor 1. These blocks normally engage cooperative slots 35 in the cutter 3.

As shown in Figs. 1 and 2, the milling cutter receiving arbor 1 is provided with a coaxial longitudinal guide bore 9 to receive the supplementary milling cutter arbor 2, and with a threaded coaxial longitudinal bore 10 in which the threaded part of a head bolt engages. The lateral wall of the longitudinal guide bore 9 has a longitudinal groove 11 (see Figure 2) into which a key 12 (see Figure 3) engages. This key 12 fits into a longitudinal groove 13 of the supplementary milling cutter arbor 2 in order to produce an efficient driving connection between the supplementary milling cutter arbor 2 in the longitudinal guide bore 9 and the rotating milling cutter receiving arbor 1. The supplementary milling cutter arbor 2 includes a centering shaft 14 and a somewhat greater diameter end portion 14a A key 23 engages a longitudinal groove 15 in the centering shaft end portion 14a and a corresponding longitudinal groove in the milling cutter 3 for transmitting the rotational movement of the milling spindle head.

The supplementary milling cutter arbor 2 is provided with an axial longitudinal bore 16, which communicates at the outer end with a hollow cylindrical enlargement 17. Between the bore 16 and enlarged portion 17 is formed an annular supporting surface 18 supporting the head 22 of the head bolt 4. An annular ring flange 19, adjacent the cutter end of the supplementary milling cutter arbor 2 engages a supporting face 25 within a recess 24 in the cutter face of the milling cutter 3 and presses the milling cutter 3 against the end flange 6 of the milling cutter receiving arbor 1. As can be clearly seen in Fig. 1, the supplementary milling cutter arbor 2, with its centering shaft extending into the longitudinal guide bore 9 of the milling cutter receiving arbor 1, is guided so that its longitudinal axis coincides exactly with the longitudinal axes of the milling cutter receiving arbor 1 and the milling spindle head. The outer diameter of the centering shaft end portion 14a of the supplementary milling cutter arbor 2 is adapted exactly to the axial bore of the milling cutter 3 so that the milling cutter 3 is maintained exactly centered on the supplementary milling cutter arbor 2.

The head bolt 4, acting as a holder of the supplementary milling cutter arbor 2 in the milling cutter receiving arbor 1, passes through the longitudinal bore 16 of the supplementary milling cutter arbor 2 and engages an axial threaded bore 10 of the milling cutter receiving arbor 1. The head bolt 4 has in its head 22 an inner hexagon or an inner serrated recess 21 for the insertion of an angular socket wrench 31 fitted to said recess 21 and adapted to be inserted into said recess 21 for attaching or releasing said head bolt 4 (Figs. 1 and 4).

As shown in Figs. 1 and 2, the head bolt 4 urges the supplementary milling cutter arbor 2 towards the milling cutter receiving arbor 1 with a large tensile force. This force acts on the milling cutter 3 through the outer collar 19 of the supplementary milling cutter arbor 2 to urge the cutter firmly against the cutter receiving arbor. There is no danger of distortion or loosening of the supplementary milling cutter arbor 2 or its end flange 19, because the supplementary milling cutter arbor 2 and its end flange 19 have a relatively large diameter and thus form a very rigid body.

When the milling cutter 3 has to be interchanged, it is no longer necessary to take off the milling cutter receiving arbor 1 from the milling spindle head 26. It is, on the contrary, merely necessary to insert the angular socket wrench 31 into the inner hexagon or serrated recess 21 of the head bolt 4 and to unscrew the head bolt 4 of the threaded bore 10 of the milling cutter receiving arbor 1, whereupon the supplementary milling cutter arbor 2 and the milling cutter 3 can be lifted off without difficulty. This simple interchangeability of the milling cutter 3 has the advantage that no damages to the precision taper surface 5 or alterations of position can arise, as can otherwise happen when the milling cutter receiving arbor 1 is taken off, and reinserted with foreign matter (dirt, chips or the like) adhering to the taper surface or by any other careless insertion of the taper 5 into the corresponding taper bore of the milling spindle head 26.

A further advantage of the cutter chuck device according to the invention arises in milling spindles in which the milling cutter receiving arbor is fixed onto the milling spindle by means of a holding wedge. The loosening and the reinserting of the holding wedge is effected, as is generally known, by means of hammer blows which submit the milling spindle together with its bearings to serious lateral stresses. In case of repeated releasing and insertion of the milling cutter receiving arbor, this leads, in the course of time, to a considerable deviation in the rotational alignment of the milling spindle and the milling cutter receiving arbor, which causes inexact operation of the milling machine.

Fig. 5 shows a modified embodiment of the supplementary milling cutter arbor according to the invention. The supplementary milling cutter arbor 27 has a common centering shaft with a uniform diameter and an end flange 28. Such a supplementary milling cutter arbor 27 is particularly suitable for milling cutters with small diameters and only needs one longitudinal groove 29 with one continuous fitted key 30, with which the supplementary milling cutter arbor 27 is brought in driving connection not only with the milling cutter 3 but simultaneously also with the milling cutter receiving arbor 1.

What I claim is:

1. A cutter chuck device for removable fastening of a milling cutter on the milling spindle head of a machine tool comprising, a cutter receiving arbor having a conical surface at one end which guides and supports said arbor in central position by engagement with a matching surface of a conical opening in the milling spindle head, said arbor having at the other end thereof a support flange for a milling cutter and a central longitudinal guide bore extending along a major portion of the arbor axis and which has a communicating threaded axial bore at the inner end thereof, a milling cutter adjacent said support flange and in contact therewith at the inner cutter end face, an axial guide bore extending through said cutter, and a supporting ring face adjacent said bore at the outer cutter end face, a sleeve-like supplemental cutter arbor fitted within the guide bores of the cutter and cutter receiving arbor to accurately hold the cutter in central engagement with the cutter receiving arbor, said supplemental cutter arbor having external cylindrical portions which accurately fit the central guide bore surfaces, a longitudinal bore through the supplemental cutter arbor which is aligned with the threaded axial bore of the cutter receiving arbor and has a supporting ring face adjacent the cutter end of the bore, and a holding end flange on the supplemental cutter arbor which engages the cutter supporting ring face to hold the cutter in position against the cutter receiving arbor, a head bolt extending through the bore of the supplemental arbor for holding the supplemental arbor in position having a head which bears against the supporting ring face of the supplemental arbor and a threaded section at its other end which engages the threaded bore of the cutter receiving arbor to place the bolt shank in tension, said supplemental cutter arbor thereby holding the cutter and said cutter receiving arbor assembly in an exactly rigid centered position with respect to the milling spindle head, and movement transferring means between the cutter receiving arbor and the milling cutter.

2. A cutter chuck device for removable fastening of a milling cutter on the milling spindle head of a machine tool comprising, a cutter receiving arbor having a conical surface at one end which guides and supports said arbor in central position by engagement with a matching surface of a conical opening in the milling spindle head, said arbor having at the other end thereof a support flange for a milling cutter and a central longitudinal guide bore extending along a major portion of the arbor axis and which has a communicating threaded axial bore at the inner end thereof, a milling cutter adjacent said support flange and in contact therewith at the inner cutter end face, an axial guide bore having the same diameter as the receiving arbor guide bore extending through said cutter, and a supporting ring face adjacent said bore at the outer cutter end face, a sleeve-like supplemental cutter arbor fitted within the guide bores of the cutter and cutter receiving arbor to accurately hold the cutter in central engagement with the cutter receiving arbor, said supplemental cutter arbor having an external cylindrical surface of uniform diameter which accurately fits the central guide bore surfaces, a longitudinal bore through the supplemental cutter arbor which is aligned with the threaded axial bore of the cutter receiving arbor and has a supporting ring face adjacent the cutter end of the bore, and a holding end flange on the supplemental cutter arbor which engages the cutter supporting ring face to hold the cutter in position against the cutter receiving arbor, a head bolt extending through the bore of the supplemental arbor for holding the supplemental arbor in position having a head which bears against the supporting ring face of the supplemental arbor and a threaded section at its other end which engages the threaded bore of the cutter receiving arbor to place the bolt shank in tension, said supplemental cutter arbor thereby holding the cutter and said cutter receiving arbor assembly in an exactly rigid centered position with respect to the milling spindle head, and movement transferring means between the cutter receiving arbor and the milling cutter.

3. A cutter chuck device for removable fastening of a milling cutter on the milling spindle head of a machine tool comprising, a cutter receiving arbor having a conical surface at one end which guides and supports said arbor in central position by engagement with a matching surface of a conical opening in the milling spindle head, said arbor having at the other end thereof a support flange for a milling cutter and a central longitudinal guide bore extending along a major portion of the arbor axis and which has a communicating threaded axial bore at the inner end thereof, a milling cutter adjacent said support flange and in contact therewith at the inner cutter end face, an axial guide bore extending through said cutter, and a supporting ring face adjacent said bore at the outer cutter end face, a sleeve-like supplemental cutter arbor fitted within the guide bores of the cutter and cutter receiving arbor to accurately hold the cutter in central engagement with the cutter receiving arbor, said supplemental cutter arbor having external cylindrical portions which accurately fit the central guide bore surfaces, a longitudinal bore through the supplemental cutter arbor which is aligned with the threaded axial bore of the cutter receiving arbor and has a supporting ring face adjacent the cutter end of the bore, and a holding end flange on the supplemental cutter arbor which engages the cutter supporting ring face to hold the cutter in position against the cutter receiving arbor, a head bolt extending through the bore of the supplemental arbor for holding the supplemental arbor in position having a head which bears against the supporting ring face of the supplemental arbor and a threaded section at its other end which engages the threaded bore of the cutter receiving arbor to place the bolt shank in tension, said supplemental cutter arbor thereby holding the cutter and said cutter receiving arbor assembly in an exactly rigid centered position with respect to the milling spindle head and groove and key connections between the supplementary milling cutter arbor, the milling cutter and the cutter receiving arbor.

References Cited in the file of this patent

UNITED STATES PATENTS

| | | |
|---|---|---|
| 1,372,577 | Wallenberg | Mar. 22, 1921 |
| 2,749,806 | Stephan | June 12, 1956 |

FOREIGN PATENTS

| | | |
|---|---|---|
| 247,281 | Switzerland | Dec. 1, 1947 |
| 716,923 | Germany | Feb. 2, 1942 |
| 1,039,212 | France | May 13, 1953 |